ically, Feb. 2, 1988

United States Patent [19]
Peng

[11] Patent Number: 4,722,125
[45] Date of Patent: Feb. 2, 1988

[54] METHOD FOR PRODUCING A TUNGSTEN CARBIDE TIP PUNCH

[76] Inventor: Da H. Peng, No. 1-1, Lane 49, Fu Te San Road, Ling Ya District, Kaohsiung, Taiwan

[21] Appl. No.: 906,515

[22] Filed: Sep. 12, 1986

Related U.S. Application Data

[63] Continuation-in-part of Ser. No. 738,048, May 24, 1985, abandoned.

[30] Foreign Application Priority Data

May 25, 1984 [JP] Japan ................. 59-107371

[51] Int. Cl.⁴ .................................. B21D 39/00
[52] U.S. Cl. ........................ 29/522 R; 228/118; 228/171; 228/122; 228/221; 228/248; 76/DIG. 11
[58] Field of Search ......... 76/DIG. 11, 101 B, 107 R, 76/DIG. 5, DIG. 6; 228/118, 119, 171, 248, 122, 132, 165, 263.12, 219, 232, 221; 72/479; 29/522 R

[56] References Cited

U.S. PATENT DOCUMENTS

| | | | |
|---|---|---|---|
| 1,648,026 | 11/1927 | Murray | 29/522 |
| 1,690,240 | 11/1928 | Norcross | 29/522 |
| 2,334,755 | 11/1943 | Eglinton | 76/DIG. 1 |
| 3,677,060 | 7/1972 | Loqvist | 72/476 |
| 3,906,617 | 9/1975 | Behringer et al. | 228/118 |
| 4,442,968 | 4/1984 | McMurray et al. | 228/231 |

FOREIGN PATENT DOCUMENTS 571969 9/1945 United Kingdom .......... 76/DIG. 1

*Primary Examiner*—Robert L. Spruill
*Assistant Examiner*—David B. Jones

[57] ABSTRACT

A method for producing a tungsten carbide tip punch includes:

(1) preparing a punch rod including a top surface having a cylindrical protrusion;

(2) placing on the top surface of the punch rod a tungsten carbide piece having a hardness greater than that of the punch rod and including a bottom surface having a crown-like indentation which opens at the bottom surface and which is capable of being well matched with said cylindrical protrusion at the lowermost portion of the crown-like indentation.

(3) applying a brazing material on the vertices of the crown-like indentation and around the interengaging surfaces of the punch rod and the tungsten carbide piece;

(4) pushing the cylindrical protrusion of the punch rod into the crown-like indentation of the tungsten carbide piece by a hydraulic activating apparatus so that the top of the cylindrical protrusion deforms along the vertices into a crown-like shape to join the punch rod and the tungsten carbide piece together; and (5) vacuum heating the brazing material and the interengaging surface for flow of the molten brazing material over all the interengaging surface to further bond them together.

3 Claims, 3 Drawing Figures

METHOD FOR PRODUCING A TUNGSTEN CARBIDE TIP PUNCH

CROSS-REFERENCE TO RELATED APPLICATION

This invention is a CIP of an application Ser. No. 738,048, filed on May 24, 1985, and now abandoned.

BACKGROUND OF THE INVENTION

The invention relates to a method for producing a punching tool, particularly to a method for producing one to the top of which a tungsten carbide piece is attached.

Nowadays, punching tools can be categorized into two types. One is made of tungsten carbide which has a high manufacturing cost and which is brittle by nature, which results in frequent tool breakage in use. As shown in FIG. 1, the other type of punching tool includes a punch rod 4 and a tungsten carbide rod 3 having more than a third of the length thereof inserted into a well-matched corresponding hole provided on the punch rod 4 with a brazing material 34 joining them together. The latter type is an improvement over the former type; however, it still suffers from the following disadvantages:

1. It requires that the tungsten rod 3 have a suitable length in order that the rods 3 and 4 can be effectively joined together.
2. It is necessary to accurately work the corresponding hole for tightly fitting the tungsten carbide rod therein so that the punching tool can be durable. Nevertheless, such a punching tool still does not have sufficient strength and necessitates frequent replacement which, in turn, inevitably reduces efficiency.
3. Owing to the difference in material, the carbide rod 3 is broken easily where it joins the peripheral portion of the bottom of the corresponding hole because of stress concentration.

SUMMARY OF THE INVENTION

It is therefore an object of the invention to provide a method for producing a tungsten carbide tip punch, which has a low manufacturing cost and by which the tungsten carbide tip punch has high wear, deformation, deflection and impact resistance through a firm fusible metallic bonding process.

According to the invention, a method for producing a tungsten carbide tip punch comprises the steps of: (1) preparing a punch rod including a top surface having a cylindrical protrusion projecting from the top surface; (2) placing on the top surface of the punch rod a tungsten carbide piece having a hardness greater than that of the punch rod, the tungsten carbide piece including a bottom surface having a crown-like indentation which, at the bottom surface, has an opening of a diameter larger slightly than that of the cylindrical protrusion and which is capable of being well matched with the cylindrical protrusion of the punch rod at the lowermost portion of the crown-like indentation, the crown-like indentation having a maximum diameter at a portion other than the opening of the crown-like indentation; (3) applying a brazing material on each of the vertices of the crown-like indentation of the tungsten carbide piece and around interengaging surfaces of said punch rod and said tungsten carbide piece; (4) pushing mechanically the cylindrical protrusion of the punch rod into the crown-like indentation of the tungsten carbide piece so that the top of the cylindrical protrusion deforms along the vertices of the crown-like indentation of the tungsten carbide piece into a crown-like shape to join the punch piece and the tungsten carbide piece together; and (5), vacuum heating the brazing material for flow of the molten brazing material over all the interengaging surfaces of the punch piece and the tungsten carbide piece to further bond the punch and tungsten carbide pieces together.

Furthermore, for convenience of the mechanical jointing of the punch rod with the tungsten carbide piece and of the application of the brazing material, the punch piece may be secured into a tube secured on a securing structure during the joint.

In the step of the vacuum heating of the brazing material, according to the prior application, the flow of the molten brazing material is over only a part of the interengaging surfaces of the punch rod and the tungsten carbide piece. Now, according to the invention, it is over all the interengaging surfaces so that firm bonding is apparently obtained. This is the improvement of the invention over the prior application.

DETAILED DESCRIPTION OF THE PREFERRED EMBODIMENT

Figure 1:
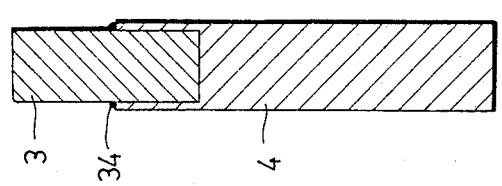
FIG. 1 is a sectional view showing a tungsten carbide tip punch produced by a method according to the prior art.

Referring to FIG. 1, a tungsten carbide tip punch produced by a method according to the invention is assembled from a punch rod 11 including a top surface 111 having a cylindrical protrusion 112 projecting from the central portion of the top surface 111, and a tungsten carbide piece 12 including a bottom surface 121 having a crown-like indentation 122 which is provided with two arched vertices and which is indented from the central portion of the lower surface 121 for engaging with the cylindrical protrusion 112 of the punch rod 11. The diameter of the crown-like indentation 122 is smallest at the opening thereof.

A typical material of the punch rod 11 may be SKH-9 or SKD-11 (in Japanese Industrial Standard) where SKD-11 comprises 1.4–1.6% Carbon, 0.15–0.35% Silicon, 0.3–0.6% Manganese, 11–13% Chromium, 0.2–0.5% Vanadium, 0.8–1.2% Molybdenum, 0.05% Polonium, and 0.01% Sulfur, and where SKH-9 comprises 0.8–0.9% Carbon, 0.45% Manganese, 3.8–4.5% Chromium, 1.6–2.2% Vanadium, 4.5–5.5 Molybdenum, 0.03% Polonium, 0.01 Sulfur, and 5.5–6.7% Wolfram.

The tungsten carbide 12 has a composition comprising 82% Wolfram Carbide and 18% Cobalt, and has a thickness of from about 3.5 mm to about 7 mm.

Figure 3:
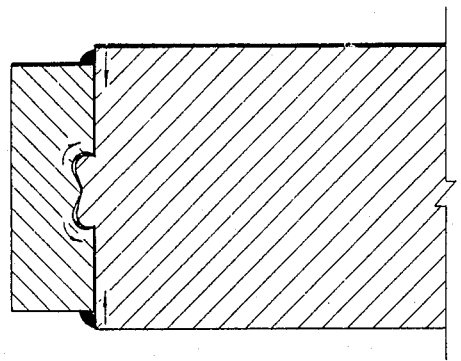
FIG. 3 is a sectional view showing the punching tungsten carbide tip punch assembled of the punch rod and the tungsten carbide piece of FIG. 2, produced by the method according to the invention.
Figure 2:
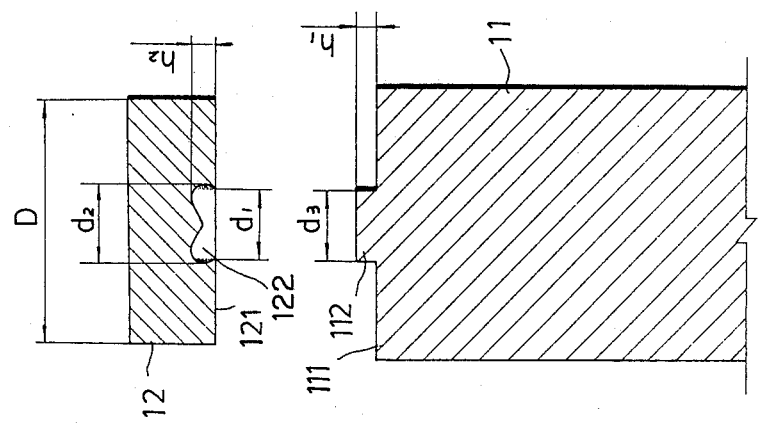
FIG. 2 is a sectional view showing a punch rod and a tungsten carbide piece for assembly of a punching tungsten carbide tip punch produced by a method according to the invention.

Additionally, the preferred relation between the punch piece 11 and the tungsten carbide 12 in size with reference to FIGS. 2 and 3 is as follows:

$d1$ = from $D/3$ to $D/2$
$d2 \cong d1 + 0.3$ mm $d_3 \cong d_1 - 0.1$ mm $h_2 = h_1 - 0.1$ mm where D is the outer diameter of the tungsten carbide piece 12, $d_1$ is the diameter of the opening of the crown-like indentation of the tungsten carbide piece 12, $d_2$ is the maximum diameter of the crown-like indentation of the tungsten carbide piece 12, $d_3$ is the diameter of the cylindrical protrusion 112 of the punch rod 11, $h_1$ is the height of the cylindrical protrusion 112 of the punch rod, and $h_2$ is the central depth of the crown-like indentation 122 of the tungsten carbide piece 12.

After completion of preparing the punch rod 11 and the tungsten carbide piece 12, a brazing material is applied on the vertices of the crown-like indentation 122 of the tungsten carbide piece 12 and around the interengaging surfaces on the two pieces 11 and 12. The applied brazing material may be, for example, a Ni-Cr alloy powder mixed in acetone.

A layer of STOP-OFF powder is then applied respectively around the brazing material applied around the interengaging surfaces on the punch rod 11 and the tungsten carbide piece 12 to prevent capillary action of the brazing material when melting within the interengaging surfaces.

Subsequently, the jointing of the punch rod 11 and the tungsten carbide piece 12 is effected.

Because the tungsten carbide piece 12 has a hardness of HRA (Hardness Rockwell A) 82-86 degrees, while the punch piece 11 has a hardness of only HRC (Hardness Rockwell C) 10-20 degrees, when the cylindrical protrusion 112 of the punch rod 11 is pushed into the crown-like indentation 122 of the tungsten carbide piece 12 by a hydraulic activating apparatus (not shown), the top portion of the cylindrical protrusion 112 will deform along the arched vertices of the crown-like indentation 122 into a crown-like shape for fitting tightly into the crown-like indentation 122 of the tungsten carbide piece 12.

Certainly, for convenience of effecting fully the jointing of the punch rod 11 and the tungsten carbide piece 12, the punch rod 11 may be, when jointed, secured into a circular tube secured on a securing structure, described in the prior application.

The last step of the invention is putting the snap fitting assembly of punch rod 11 and tungsten carbide piece 12 into a vacuum heating apparatus, such as Model FHH-45GH manufactured by Nihon Punch Shinku Kabushiki Kaishiya in Japan, to melt the brazing material applied on the assmebly for flow of the molten brazing material over all the interengaging surfaces so as to further bond the punch rod 11 and the tungsten carbide piece 12 together by the melten brazing material. It is understood that the molten brazing material can flow over all the interengaging surfaces because it can flow capillarily along the arched vertexes of the indentation 122.

The last step described in the embodiment further includes in turn five successive sub-steps of:

(1) putting the assembly of the punch rod 11 and the tungsten carbide piece 12, assembled mechanically by the hydraulic activating apparatus, (described as the assembly hereinafter) into a vacuum heating apparatus having a vacuum maintained at about 0.3 Torr;

(2) soaking the assembly at a temperature of 450° C.-550° C.;

(3) soaking the assembly at a temperature of 700° C.-850° C.;

(4) soaking the assembly at a temperature of 900° C.-1030° C.; and (5) heating the assembly to a temperature of 25° C.-100° C. over the melting point of the brazing material.

The time spent in each of Sub-steps (2)-(4) is about half an hour and the time spent in Sub-step (5) is 10-30 minutes.

After Sub-step (5) is performed, the assembly is sent to a cooling chamber and then is subjected to a tempering treatment. For the SKH-9 punch rod 11, the tempering treatment is done three times at a temperature of 540° C.-580° C., each time lasting 1 hr. For the SKD-11 punch rod 11, the tempering treatment is done twice at a temperature of 150° C.-220° C., each time lasting lasting 1 hr. Certainly, each of the interengaging surfaces should be well pre-ground.

In addition to the initial mechanical joint, according to the invention, subsequent brazing process is effected over all the interengaging surfaces of the punch rod 11 and the tungsten carbide piece 12. Thus, the tungsten carbide top punch after the mechanical joint and particularly the brazing is very solid and durable. The above-mentioned object is therefore achieved by the method of the invention.

With the invention thus explained, it is apparent that various modifications and variations can be made without departing from the scope of the invention. It is therefore intended that the invention be limited as indicated in the appended claims.

What is claimed is:

1. A method for producing a tungsten carbide top punch comprising: (1) preparing a punch rod made of tool steel or high speed steel including a top surface having a cylindrical protrusion;

(2) placing on said top surface of said punch rod a tungsten carbide piece including a bottom surface having a crown-like indentaiton with a plurality of vertices which has at said bottom surface an opening of a diameter slightly larger than that of said cylindrical protrusion and which has a size relative to said cylindrical protrusion capable of being well-matched with said cylindrical protrusion at a lowermost portion of said crown-like indentation, said crown-like indentation having a maximum diameter at an other portion than said opening;

(3) applying a brazing material on each of said vertices of said crown-like indentation of said tungsten carbide piece;

(4) pushing mechanically said cylindrical protrusion of said punch rod into said crown-like indentation of said tungsten carbide piece so that an uppermost portion of said cylindrical protrusion deforms along said vertices of said crown-like indentation into a crown-like shape to join said punch rod and said tungsten carbide piece together;

(5) applying a brazing material around all interengaging surfaces of said punch rod and said tungsten carbide piece;

(6) soaking said brazing material in a vacuum maintained at about 0.3 Torr step by step to about 1030° C., and continuously heating to a temperature of 25° C.-100° C. above the melting point of said brazing material for 10-30 minutes so that said brazing material is molten to flow by capillary action over all said interengaging surfaces of said punch rod and said tungsten carbide piece to further bond said punch rod and said tungsten carbide piece together; and (7) keeping an assembly of said punch rod and said tungsten carbide piece in a cooling chamber so that said punch rod is quenched and thus hardened.

2. A method as claimed in claim 1, wherein said size of said crown-like indentation relative to said cylindrical protrusion is subjected to the relation of:

$d1 = $ from $D/3$ to $D/2$
$d2 \cong d1 + 0.3$ mm
$d3 \cong d1 - 0.1$ mm
$h2 = h1 - 0.1$ mm where D is the outer diameter of said tungsten carbide piece, d1 is the diameter of the opening of said crown-like indentation of said tungsten carbide piece, d2 is the maximum diameter of said crown-like indentation of said tungsten carbide piece, d3 is the diameter of said cylindrical protrusion of said punch rod, h1 is the height of said cylindrical protrusion of said punch rod, and h2 is the central depth of said crown-like indentation of said tungsten carbide piece.

3. A method as claimed in claim 1, wherein a soaking process of step (6) comprises in turn three successive sub-steps:

(1) soaking said brazing material and said interengaging surfaces at a temperature of 450° C.–550° C.

(2) soaking said brazing material and said interengaging surfaces at a temperature of 700° C.–850° C.; and (3) soaking said brazing matrial and said interengaging surfaces at a temperature of 900° C.–1030° C.;

the time spent in each of said sub-steps being about half an hour.

* * * * *